(No Model.)
G. H. CAMERON.
SAW MILL DOG.
No. 282,048. Patented July 31, 1883.
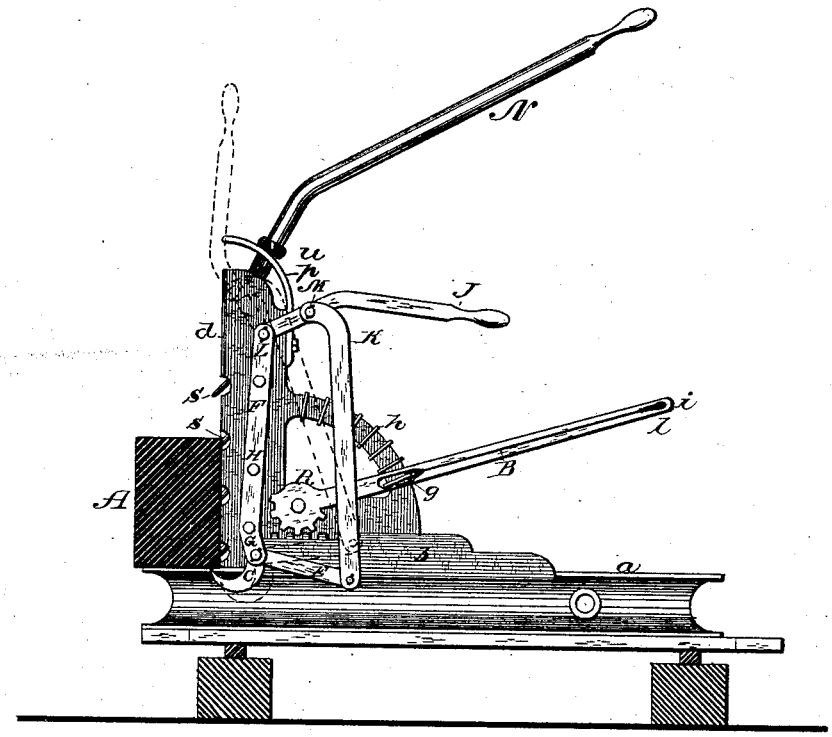
Witnesses:
C. B. Story.
W. J. Sinnott.
Inventor:
George H. Cameron
By, Jas. B. Erwin
Attorney:

UNITED STATES PATENT OFFICE.

GEORGE H. CAMERON, OF OSHKOSH, WISCONSIN.

SAW-MILL DOG.

SPECIFICATION forming part of Letters Patent No. 282,048, dated July 31, 1883.

Application filed April 24, 1883. (No model.)

*To all whom it may concern:*

Be it known that I, GEORGE H. CAMERON, a citizen of the United States, residing at Oshkosh, in the county of Winnebago and State of Wisconsin, have invented certain new and useful Improvements in Saw-Mill Dogs; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

My invention relates to improvements in a certain saw-mill dog for which Letters Patent of the United States No. 233,409 were granted to William Gowen, October 19, 1880, and pertains to the device by which the timber to be cut is secured at its under side.

The construction and arrangement of my improvement is explained by reference to the accompanying drawing, which represents a side elevation of the same in connection with the saw-mill dog described in said patent.

The head-block $a$, knee $d$, slide $b$, holding-dogs S, lever I, segment-gear R, lever N, retaining-spring $p$, stud $u$, pawl $g$, and ratchet $h$ are all constructed and arranged substantially as shown and described in said Patent No. 233,409.

The holding-dogs S S are forced downward into the timber by the downward action of the lever N, and are withdrawn therefrom by throwing said lever N upward and forward. The lever N is retained in a vertical position, when thrown upward, by the friction of the stud U upon the spring $p$. The knee $d$, slide $b$, and retaining-dogs S, with the operative mechanism, are moved forward with the timber A by the lever $i$ and segment-gear R. The lever $i$ is retained at any desired point of adjustment by pawl or catch $g$ and latch $l$, the catch $g$ being operated by latch $l$ and rod B. In addition to these described parts, which, as stated, are fully shown in said patent, I add the curved upward-acting holding-dog C, provided with a lever, E. The dog C is held in place at the side of the head-block by bar F and pivoted bolt G. The bars F are rigidly connected with the side of the knee $d$ by bolts H H. The timber A being in place, the dog C is forced up into the lower surface of the timber, as shown, by a down-pressure upon the lever E. Motion is communicated to the end of the lever E from the handle J by the bar K. The handle J is pivoted to the bars F and K by pins L and M. The bar K is curved forward at its upward end, so that when the lever J is thrown forward, as indicated by dotted lines, the pin M is brought in front of the pin L, when the line of gravity of the bar K is brought in front of its support, whereby the handle J, when elevated, is prevented from dropping back, and the dog C is retained below and free from contact with the timber.

Having thus described my invention, what I claim as new, and desire to secure by Letters Patent, is—

1. In set-works for saw-mills, the knee provided with a series of downward-acting dogs connected with an operating-handle, in combination with an upward-acting dog provided with a separate operating-handle, substantially as set forth.

2. In set-works for saw-mills, the combination of the knee $d$, bar F, as rigidly attached to the side of said knee, upward-acting dog C, attached to the lower end of said knee, and provided with lever E, handle J, attached at a fixed point to the upper end of said knee, and curved bar K, said bar K being adapted by its curved shape, when raised, to bring the line of its gravity past the supporting-pin L, whereby said handle is retained in its upper position, as set forth.

In testimony whereof I affix my signature in presence of two witnesses.

GEO. H. CAMERON.

Witnesses:
WILLIS E. WILBER,
P. W. HOUGHTON.